United States Patent Office 3,092,454
Patented June 4, 1963

3,092,454
PREPARING ALUMINA BETA TRIHYDRATE
Louis C. Doelp, Jr., Glen Mills, Pa., assignor to Air Products and Chemicals, Inc., a corporation of Delaware
No Drawing. Filed Nov. 20, 1959, Ser. No. 854,271
3 Claims. (Cl. 23—143)

This invention relates to the crystallization of the beta trihydrate of alumina from alkaline aqueous solutions.

As explained in a pamphlet called "Technical Paper No. 10," published by the Aluminum Company of America, Pittsburgh, 1956, the alpha and beta trihydrates of alumina differ in significant respects, as indicated:

|  | Alumina trihydrates | | |
| --- | --- | --- | --- |
|  | alpha | beta | Percent diff. |
| Density, g./ml. | 3.01 | 3.44 | 14 |
| Heat of formation, kcal./m. | −613.7 | −609.4 | 7 |
| Magnetic susceptibility units of $10^{-6}$ | −0.43 | −0.46 | 7 |
| Refractive index | 1.574 | 1.583 | 0.6 |
| Energy of activation for dehydration, kcal./m. | 31 | 23 | 35 |

Said pamphlet explains that "beta trihydrate is not on the market at this time." In recent years, however, at least four manufacturers have offered to sell tonnage quantities of beta alumina trihydrate. The price at which beta alumina trihydrate has been from about 20 cents to 90 cents per pound more than the price of alpha alumina trihydrate which sells at about 5 cents per pound. The beta trihydrate dissolves more readily in either aqueous acid or aqueous alkali than the alpha trihydrate, and has other advantages which might not be obvious from considering certain physical measurements. Sorptive alumina obtained by dehydrating the beta trihydrate and/or hydrated alumina containing at least a major weight percent of beta trihydrate has catalytic properties superior for certain purposes to the catalytic properties of sorptive alumina derived from the alpha trihydrate. Inasmuch as some catalyst supports are nearly pure alumina, the difference in raw material cost per pound of catalyst carrier may be nearly $1.40 in starting with beta trihydrate instead of alpha trihydrate. Notwithstanding such great differences in cost, beta trihydrate has been employed in increasing amounts in catalyst manufacture. Impure forms of beta trihydrate, containing significant amounts of alpha monohydrate, amorphous alumina, and/or alpha trihydrate, have shared the trend toward using beta trihydrate as the starting material for catalyst supports.

When cooled aqueous alkaline dispersions of the alpha monohydrate of alumina are aged and/or precipitated, there is some tendency for the beta trihydrate to form first, and for the alpha trihydrate to form only after more prolonged moderate temperature aging. The alpha monohydrate of alumina can be formed from the alpha trihydrate in boiling aqueous systems, and possibly may be formed as an intermediate in the conversion from the alpha to the beta trihydrate. If alumina hydrates are precipitated from moderately hot solutions, alpha trihydrate predominates.

Beta alumina trihydrate has previously been prepared by alkaline hydrolysis of alumina alcoholates. However, a survey of all of the various attempts to achieve beta trihydrate production provides little guidance concerning the factors certain to result in beta trihydrate production. Although the conversion of alumina alpha trihydrate to alumina beta trihydrate has appeared to be an interesting possibility for decades, literature descriptions pertinent thereto have not been abundant.

In accordance with the present invention, a powder consisting only of high purity hydrated alumina, and consisting predominantly of beta trihydrate is prepared by drying the precipitate obtained by acidifying an aqueous solution of tetraorganoammonium aluminate, which solution may be prepared by dissolving a less expensive hydrate of alumina (e.g. alpha trihydrate) in the aqueous solution of quaternary base.

The nature of the invention can be further clarified by reference to a plurality of examples.

EXAMPLE I

An aqueous solution of tetramethylammonium hydroxide was prepared to correspond to a concentration of 491 g. of the tetraorganoammonium hydroxide per liter, corresponding to 5.4 mols of the quaternary hydroxide per liter. To 60 milliliters of such solution 7.44 g. of alpha alumina trihydrate were added and the reaction mixture was heated at the boiling point for about 30 minutes to dissolve completely the alpha alumina trihydrate. The amount of tetramethylammonium hydroxide employed was approximately twice as great as that theoretically necessary for the preparation of the tetraorganoammonium aluminate. Thus the concentration of the tetraorganoammonium ion present as excess hydroxide is approximately equal to the tetraorganoammonium ion concentration in the aluminate. After the solution had been prepared at an elevated temperature such as 100° C. or the boiling point of the solution, it was cooled to 40° C. and then acidified by the introduction of gaseous carbon dioxide at a relatively slow rate. Hydrates of alumina were formed by the interaction of the alkaline aluminate component and the acidic carbon dioxide gas. The hydrated alumina was precipitated from the solution of quaternary aluminate solution and the precipitate was washed several times with deionized water. The thus separated precipitate was dried in air and then was dried overnight at 105° C. A crystallographic analysis of the thus dried alumina hydrate indicated that the powder contained about 70% by weight of beta alumina trihydrate and about 30% alpha monohydrate.

The tetramethylammonium hydroxide is regenerated by treating the aqueous solution of the carbonate with calcium hydroxide and separating the precipitated calcium carbonate. The equations for the series of reactions are:

$2(CH_3)_4NOH + \alpha Al_2O_3 \cdot 3H_2O \rightarrow 2(CH_3)_4NAlO_2 + 4H_2O$
$2(CH_3)_4NAlO_2 + CO_2 + 4H_2O$
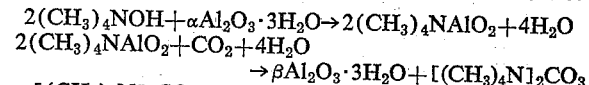
$\rightarrow \beta Al_2O_3 \cdot 3H_2O + [(CH_3)_4N]_2CO_3$
$[(CH_3)_4N]_2CO_3 + Ca(OH)_2 \rightarrow CaCO_3 + 2(CH_3)_4NOH$ The beta alumina trihydrate is a more valuable product than the alpha trihydrate.

EXAMPLE II

A hydrated alumina consisting predominantly of beta trihydrate is prepared by passing a stream of gaseous carbon dioxide into an aqueous solution containing about 2.5 mols per liter of tetraethylammonium hydroxide and about 0.8 mol per liter of alpha alumina trihydrate while maintaining the solution of tetraorganoammonium aluminate (containing only a relatively small proportion of excess quaternary base) at a temperature of about 70° F., aging the system for about a day at 70° F., and filtering to recover the precipitate.

The precipitate is dried in a stream of humid air at about 100° F. to provide a powder. By X-ray analysis of the powder, the presence of about 4% alpha monohydrate and about 96% beta trihydrate is indicated.

EXAMPLE III

In a simulation of continuous operation, a stream of 7 molal tetraethanolammonium hydroxide is injected into an agitated suspension of alpha alumina trihydrate.

Through a sintered glass filter disk, a solution of tetraethanolammonium aluminate is withdrawn from the suspension and transferred to a precipitation zone in which gaseous carbon dioxide is injected. Continuous centrifuging of the stream permits the separation of an aqueous solution of a mixture of the carbonate, bicarbonate and hydroxide of tetraethanolammonium hydroxide and the separation of the precipitated hydrate. The aqueous solution is heated to evolve the $CO_2$ for reuse and to regenerate the quaternary hydroxide. The precipitated alumina hydrate is transferred to a countercurrent washing vat, from which a slurry of alumina hydrate is withdrawn. The alumina hydrate slurry is dried in a vacuum spray drying tower to form a dry powder. The dried powder is analyzed by X-ray spectography and found to consist predominantly of beta alumina trihydrate with less than 20% of each of the contaminating hydrates. The heats of dissolving and/or heats of crystallization are sufficiently small that the preparation of the slurry can be conducted adiabatically. Inasmuch as the heating and cooling costs are primarily for the salvaging of the chemicals, and almost no chemicals are consumed, and almost no labor is required for the maintenance of the continuous operation, production costs for transforming alpha trihydrate to beta trihydrate are attractively low.

The purity of the beta trihydrate can be enhanced by one or more stages of prolonged aging for from about 2 to 24 hours in an aqueous solution of tetraorganoammonium aluminate at about 40° C., during which carbon dioxide is added slowly to precipitate the high purity beta trihydrate. Dried powder of very high purity beta trihydrate can desirably be injected into the stream fed to the crystallization zone to act as seed crystals.

EXAMPLE IV

Alumina beta trihydrate is prepared following a procedure generally like Example I but substituting various reagents or conditions, as indicated in Table II, the product in each run being satisfactory for preparing a hydrated alumina powder containing more than 51% beta trihydrate.

Table II

| Run | Variable |
|---|---|
| A | benzyltrimethylammonium as quaternary ion. |
| B | methylpyridinium as quaternary ion. |
| C | formic acid for acidification. |
| D | oxalic acid for acidification. |
| E | precipitation at 50° C. |
| F | precipitation at 15° C. |
| G | initial washings with 4% acetic acid. |
| H | alumina alpha monohydrate instead of alpha trihydrate. |
| I | amorphous gelatinous alumina instead of alpha trihydrate. |
| J | 70 minute cooling from 100° to 40° C. |

It should be noted that in run J, the cooling of the solution from 100° C. to 40° C. is conducted so slowly as to require at least an hour. The concentration of the tetraorganoammonium hydroxide may be 2.5 (Example II) or 5.4 (Example I) or 7 (Example III) molar but must be more than 1 but less than 10 molar.

Obviously many modifications and variations of the invention as hereinbefore set forth may be made without departing from the spirit and scope thereof, and therefore only such limitations should be imposed as are indicated in the appended claims.

What is claimed is:

1. The method of preparing an alumina hydrate consisting predominantly of alumina beta trihydrate which includes the steps of: dispersing hydrated alumina selected from the group consisting of alumina alpha monohydrate, alumina alpha trihydrate, amorphous gelatinous hydrated alumina, and mixtures thereof at a temperature lower than about 40° C. in an aqueous solution of more than 1 but less than 10 molar of a tetramethyl ammonium hydroxide to provide a solution containing tetramethyl ammonium aluminate; adding carbon dioxide to said solution of tetramethylammonium aluminate at a temperature lower than about 40° C. to precipate an alumina hydrate consisting predominantly of alumina beta trihydrate; separating said precipitate; and drying said precipitate to provide an alumina hydrate powder consisting premoninantly of alumina beta trihydrate.

2. The method of claim 1 in which the tetramethylammonium hydroxide is present in a concentration providing excess hydroxide approximately equal to the concentration of the tetramethylammonium aluminate, and in which the precipitate is water washed after separation and before drying.

3. The method of preparing alumina beta trihydrate which method includes the steps of: dispersing alumina alpha trihydrate in a hot solution consisting of water and tetramethylammonium hydroxide in a concentration greater than 1 but less than 10 molar to provide a solution containing tetramethylammonium aluminate at about 100° C.; cooling said solution for more than one hour to below 40° C.; adding carbon dioxide to said solution of tetramethylammonium aluminate at a temperature lower than about 40° C. to precipitate beta alumina trihydrate; water washing said precipitate; and drying said washed precipitate to provide an alumina hydrate powder consisting predominantly of alumina beta trihydrate.

References Cited in the file of this patent

UNITED STATES PATENTS

| 2,247,624 | Wall | July 1, 1941 |
| 2,733,219 | Bloch | Jan. 31, 1956 |
| 2,893,837 | Kearby et al. | July 7, 1959 |
| 2,894,898 | Oettinger et al. | July 14, 1959 |
| 2,913,400 | Burton et al. | Nov. 17, 1959 |

OTHER REFERENCES

Mellor: "A Comprehensive Treatise on Inorganic and Theoretical Chemistry," vol. 5, page 289, Longmans, Green and Co., N.Y., 1924.

Brezina: "Chemical Abstracts," vol. 17, pages 1363–1364, 1923.